Patented Sept. 28, 1954

2,690,399

UNITED STATES PATENT OFFICE 2,690,399

BLACK CUPREOUS POWDER AND METHOD
OF MAKING THE SAME

Dean S. Hubbell, Pittsburgh, Pa., assignor to H. H.
Robertson Company, Pittsburgh, Pa., a corporation of Pennsylvania No Drawing. Application October 11, 1951,
Serial No. 250,952

4 Claims. (Cl. 106—290)

This invention relates to a black cupreous powder and to a method of making the same.

The invention has for one of its objects to provide a novel process by which a finely divided black cupreous powder may be produced in an economical and efficient manner.

Another object of the invention is to produce a novel black cupreous powder which may be used with advantage as a black pigment for antifouling paints and for other purposes where a cuprous form of finely divided copper may be used.

With these general objects in view and such others as may hereinafter appear, the invention consists in the finely divided black cupreous powder and method of making the same hereinafter described and particularly defined in the claims at the end of this specification.

Cement copper or copper precipitate as produced at the refineries or mines comprises a brownish red sludge wherein the copper is present in the form of a peculiar crystalline form of copper particle, dendritic in nature, and capable of being easily crushed when subjected to impact or crushing, as by being passed through one of several types of hammermills, jet pulverizers and ball mills. The present process for producing a black cupreous powder for use as an antifouling pigment and for other purposes for which ordinary copper-colored copper powder is at present used, contemplates the treatment of the cement or precipitated copper sludge in its wet condition as received from the refineries or mines with an alkaline solution, preferably with ammonia, to thoroughly wet the individual particles of the cement copper with the alkaline and preferably ammonia solution. The thus treated cement copper particles may be oxidized in the air and converted in a matter of a few hours into a black condition. When the copper powder has reached the desired color, provision is made for flash or quickly drying the same and then pulverizing it to produce a black cupreous powder consisting essentially of metallic copper particles, cuprous oxide and cupric oxide, as will be described. Experience has demonstrated that the components of a cupreous powder produced by the foregoing method may vary from 40 to 50% of metallic copper and from 15 to 30% of cuprous oxide, and from a small percent of cupric oxide to approximately 50%. For most purposes, however, it is preferred that the cupreous powder be produced to contain from 40 to 50% metallic copper and from 15 to 30% of cuprous oxide, and in the neighborhood of 30% of cupric oxide.

While, as above indicated, other alkaline solutions may be used, most satisfactory results have been obtained utilizing ammonia solutions in various degrees of concentration in order to wet the particles of the cement copper. The ammonia serves as a catalyst to effect the relatively rapid spontaneous oxidation of the cement copper when exposed to the air. In practice, I prefer to place the cement copper on a filtering medium and wash the same with the ammoniacal solution, leaving the particles of the cement copper fairly wet with the ammoniacal solution. This wet cement copper is then spread out into a thin layer, preferably of the order of a quarter of an inch in thickness and exposed to the atmosphere. The cement copper quickly changes from a reddish to a black color in the matter of several hours. If no ammoniacal solution or equivalent alkaline catalyst is used, then it is a matter of weeks before the oxidation of the cement copper can be effected. It is extremely desirable that the cement copper be spread in relatively thin layers for the reason that if piled in thick layers the poor conductivity of the cement copper causes the whole mass to heat up to an excessive degree converting all or most of the copper content to the cupric form and preventing the formation of the desired cupreous powder embodying metallic copper and cuprous oxide.

After the cupreous powder has been produced, provision is made for flash or quickly drying the same down to a moisture content of from 5 to 10%, and in this condition the material is ready to be passed through an impact mill. Because of the peculiar crystalline form of the copper particles contained in the cement copper and from which the present cupreous product has been produced, the latter is dendritic in nature and capable of being easily crushed when subjected to impact, as by passing through one of the various types of available hammermills. The procedure which it is recommended to be followed in the grinding of the cupreous powder is preferably that set forth in my United States Patent No. 2,420,540, and in the resulting product the moisture content is reduced to a fraction of 1%, and the particle size is preferably reduced to the point where most of the particles lie within the range of 10 to 40 microns. It is critical that the cupreous powder of the present invention be ground to a sufficiently small size so that the ratio of surface to body is high thereby enabling the powder to function efficiently as an antifouling coating for ships and for other purposes where its solubility is a factor.

During the passage of the dendritic cupreous powder containing substantial amounts of unreacted dendritic copper through the impact or other crushing mill, such for example, as through a Raymond Imp mill, the friable particles are broken apart, and the operation is continued until the particle is reduced to a few microns as above described. The new metallic surfaces produced by the crushing of the copper particles are produced at a time when the copper particles are hot as a result of the impact, and these surfaces are swept by an atmosphere that is at least somewhat oxidizing in nature. As a result some cuprous oxide film is formed on the surface of the individual copper particles. This cuprous oxide film appears to completely surround and protect the metallic copper particles from further oxidation. In this respect, the cuprous oxide films on the copper particles assist in imparting stability against oxidation when the cupreous powder is exposed to the air as in storing.

Having thus described the invention, what is claimed is:

1. A finely divided black cupreous powder adapted for use as a black pigment in antifouling paints comprising from 40 to 50% by weight of metallic copper particles having protective films of cuprous oxide thereon, from 15 to 30% of cuprous oxide particles, and from 5 to 50% of cupric oxide particles.

2. A finely divided black cupreous powder adapted for use as a black pigment in antifouling paints comprising from 40 to 50% by weight of metallic copper particles having protective films of cuprous oxide thereon, from 15 to 30% of cuprous oxide particles, and about 30% cupric oxide particles.

3. In the method of making a black cupreous powder for use as an antifouling pigment, the steps comprising treating wet cement copper sludge with an alkaline solution, then exposing the thus treated cement copper while spread in a thin layer to the atmosphere to effect substantially spontaneous oxidation of a portion of the copper content to cupric oxide, then flash drying the wet cupreous product to a moisture content of from 5 to 10%, and then grinding the product to a small particle size and under conditions to form protective cuprous oxide films on the metallic copper particles.

4. In the method of making a black cupreous powder for use as an antifouling pigment, the steps comprising wetting cement copper with an ammoniac solution, then exposing the thus wet cement copper while spread in a thin layer to the atmosphere to effect substantially spontaneous oxidation of a portion of the copper content to cupric oxide, then flash drying the wet cupreous product to a moisture content of from 5 to 10%, and then grinding and drying the product to a small particle size and under conditions to form protective cuprous oxide films on the metallic copper particles.

References Cited in the file of this patent

UNITED STATES PATENTS

| Number | Name | Date |
|---|---|---|
| 1,963,105 | Swift | June 19, 1934 |
| 2,420,540 | Hubbell | May 13, 1947 |
| 2,536,096 | Rowe | Jan 2, 1951 |

OTHER REFERENCES

"Antifouling Paints," Industrial and Engineering Chem. No. 7, vol. 41, Alexander et al., pp. 1532–1534, 1948.

"Action of Antifouling Paints," Terry et al., Industrial and Engineering Chem., vol. 38, No. 7, July 1946, pp. 699, 700.